March 12, 1968  K. H. NEULINGER ETAL  3,373,311
AUTOMOBILE HEADLAMP SYSTEM
Filed Oct. 22, 1965

WITNESSES:
John L. Chopp
Blair R. Stuckball

INVENTORS
Karl H. Neulinger and
Paul J. Yatcko
BY
W.D. Palmer
ATTORNEY

United States Patent Office 3,373,311
Patented Mar. 12, 1968

3,373,311
AUTOMOBILE HEADLAMP SYSTEM
Karl H. Neulinger, Bronx, N.Y., and Paul J. Yatcko, Livingston, N.J., assignors to Westinghouse Electric Corporation, Pittsburgh, Pa., a corporation of Pennsylvania
Filed Oct. 22, 1965, Ser. No. 502,258
4 Claims. (Cl. 315—83)

ABSTRACT OF THE DISCLOSURE

An automobile headlamp system including four sealed-beam headlamps disposed in pairs on each side of the front of a motor vehicle and an energizing circuit having a panel switch and a dimmer switch. The energizing circuit is operable in one position of the panel switch to provide low beam illumination from one headlamp of each pair and operable to add the illumination of a third headlamp to the low beam illumination by actuation of the dimmer switch. The energizing circuit is operable in a second position of the panel switch to add the remaining headlamp to the low beam illumination provided by the first mentioned headlamps and the dimmer switch is operable in the second position of the panel switch to return the system to low beam illumination from a condition wherein all four headlamps are lit without any visible jumping effect in transition from one beam to another.

---

Figure 1:
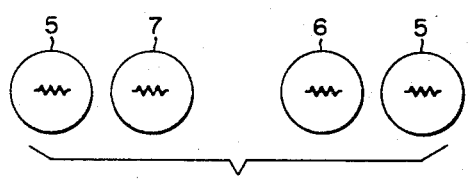

The present invention relates to an automobile headlamp system and more especially to a tri-beam system in which greater highway illumination under all driving conditions is obtained while at the same time reducing the possibility of glare to the operator of an approaching vehicle on turnpikes and divided superhighways.

At the present time all motor vehicles utilize a two-beam system with the high-beam employed for open highway driving and the low-beam when meeting approaching or oncoming traffic. In order to provide sufficient illumination ahead of the motor vehicle, particularly at the present legal speed limits on major highways, the high-beam must produce a minimum illumination at an approved height above the highway surface and at an established distance ahead of the vehicle. Although this distribution of light is satisfactory for open road conditions without approaching traffic it is a recognized fact that such conditions do not normally exist. Very often on the nation's highways with the result that headlight glare is frequently experienced by the operator of an approaching vehicle because of the wide light distribution of the high beam, until the headlamp beam is lowered from "high" to "low." In dimming the beam of present type automobile headlamp systems at present maximum by all speeds it all too frequently happens that not enough illumination is provided ahead of the vehicle along the white or yellow stripe indicating the center of the highway or left edge of the traffic lane to assure the desired degree of safety, particularly under turnpike or interstate highway speed conditions, thus giving rise to accident hazards. In addition, all present day headlamp systems employ one or more filaments for high-beam illumination which are separate and distinct from those energized for low-beam illumination. Consequently, changing from high to low-beam illumination produces a disconcerting jumping effect and a momentary total lack of illumination.

It is accordingly an object of the present invention to provide an automobile headlamp system wherein three beams are employed which thus mitigates to a very great extent the hazards of high speed travel on the highways at night.

Another object of the present invention is the provision of a tri-beam headlamp system for automobiles, wherein a turnpike beam is employed for high speed highway travel as two vehicles approach each other traveling in opposite directions, for the purpose of adequately projecting illumination ahead of the vehicle along the dividing stripe in the center of the highway without producing glare in the eyes of the oncoming operator.

A further object of the present invention is to eliminate the disconcerting jumping effect produced by the shift from one beam to another in present day vehicle headlamp systems.

The foregoing objects of the present invention, together with other objects which will become obvious to those skilled in the art from the following description, are achieved by preferably providing higher wattage, single, on-focus filament lamps, or quartz iodine lamps if desired, together with an appropriate switching system so that a smooth transition from low and either turnpike or high beam is accomplished by the adding-on effect which thus eliminates the previously known jumping effect to the driver's vision and at the same time maintains foreground lighting when cresting a hill by continued low-beam illumination.

Figure 2:
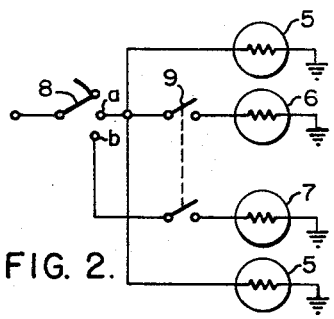
Figure 3:
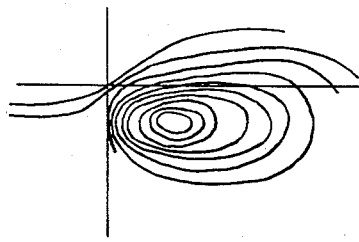
Figure 4:
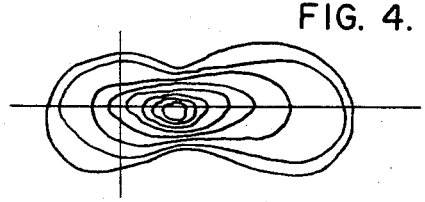
Figure 5:
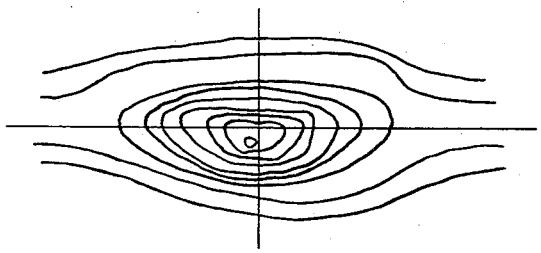
Figure 7:
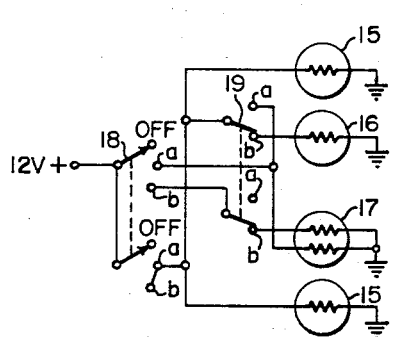
Figure 6:
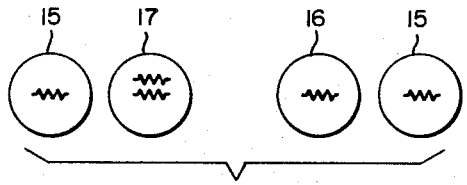

The present invention can be readily understood by reference to the accompanying drawing wherein:

FIGURE 1 is a schematic illustration of the present tri-beam automobile headlamp system utilizing four single filament sealed-beam headlamps one of which may employ a quartz iodine lamp as the light source, or an incandescent tungsten filament, FIG. 2 is a circuit diagram for the energization and switching of the tri-beam lamp system of the present invention, FIG. 3 is an isocandle diagram illustrating the light pattern produced by a low-beam lamp of tri-beam system of the present invention, FIG. 4 is an isocandle diagram illustrating the light pattern produced by the turnpike beam lamp of the tri-beam system of the present invention, FIG. 5 is an isocandle diagram illustrating the light pattern produced by the high-beam lamp of the tri-beam system of the present invention, FIG. 6 is a schematic illustration of a slight modification which the tri-beam automobile headlamp system of the present invention may take, and FIG. 7 is a circuit diagram for the energization and switching of the modified tri-beam headlamp system of FIG. 6.

Referring now more specifically to the drawings, the tri-beam headlamp system of the present invention as shown in FIG. 1 comprises four lamps of the usual sealed-beam type, which may be disposed vertically above each other in pairs or preferably in a horizontal plane with a pair on the front of the vehicle adjacent each side thereof, in the present manner of headlamp installation by automobile manufacturers. The two outboard sealed-beam lamps 5 are for low-beam driving and are provided with shielded filaments which preferably are of about 50 watts with such filament at the focus of the reflector utilizing prismatic lens. All lamps may be either the all glass, sealed-beam, seven-inch diameter type or the similar five and three-quarter inch diameter type or the two outboard lamps of one type and the two inboard of the other type, with the final selection dictated by automotive styling limitations which presently favors the smaller lamp as most practical. From the illumination standpoint, however, the larger the reflector of a given focal length the greater the efficiency of the headlamp system.

In addition to the two 50 watt outboard sealed-beam lamps 5, the present tri-beam system utilizes an inboard spot lens lamp 6 provided with an on-focus shielded filament of about 37.5 watts and a further inboard lamp 7, which may be a quartz iodine lamp, or a conventional incandescent tungsten filament lamp of about 60 watts having its filament likewise on focus within the reflector in which it is sealed. By reference now more specifically to FIG. 2 it will be noted that when the two-position instrument panel switch 8 is pulled out to its first position a, and assuming the foot-operated dimmer switch 9 is open as shown in FIG. 2, the two outboard lamps 5 are then energized by the vehicle electrical system thus providing low-beam illumination. These 50 watt low-beam lamps 5 each produce a beam pattern as shown by FIG. 3 wherein the top edge of high intensity is substantially on the horizontal H axis while the left edge of high intensity is approximately two inches to the right of the vertical V axis. Such low-beam as produced by the two sealed-beam lamps 5 is accordingly utilized for city driving and whenever the geometry of approaching oncoming traffic prevent the use of turnpike or high beam.

Upon closure of the dimmer switch 9, the on-focus 37.5 watt inboard turnpike lamp 6 is energized and thus adds its beam pattern to that of the two low-beam lamps 5. The specific beam pattern of this turnpike lamp 6 is shown by the isocandle diagram of FIG. 4 wherein the geometric center of the high intensity zone is substantially on the horizontal H axis and approximately eight inches to the right of vertical. The specific beam pattern of FIG. 3 along with those of FIGS. 4 and 5, later to be described are merely illustrations of optimum beam patterns which may be provided for by anyone of the several methods commonly employed in the art. This turnpike beam pattern is so directed that it reaches out beyond the low-beam on the left hand side of the traffic lane, and brightly illuminates either the dividing stripe in the center of the highway or left edge of the traffic lane for high speed turnpike driving without producing objectionable glare in the eyes of the operator of an approaching vehicle. Under conditions or on roads where vehicular density allows the use of the high beam, the two-position instrument panel switch 8 is pulled out to its second position b which then causes energization of the inboard 60 watt on-focus high-beam quartz iodine or tungsten filament lamp 7 employing a prismatic lens. This high-beam lamp 7 produces a substantially wide distribution rectangular beam pattern, as shown by the isocandle diagram of FIG. 5, wherein it will be noted that the geometric center of high intensity zone of the light beam is substantially centered at the intersection of the horizontal H and the vertical V and hence is added to the light beams produced by the inboard turnpike lamp 6 along with that of the two outboard low-beam lamps 5. Opening of the foot dimmer switch 9 returns the system to the low beam outboard lamps 5 from either the turnpike beam or high beam condition since this extinguishes either or both of these latter lamps 6 and 7.

The modification of the tri-beam headlamp system of the present invention as shown in FIGS. 6 and 7 differs from that previously described merely in the substitution of a two-filament prismatic lens lamp 17 for the 60 watt high beam quartz iodine or tungsten filament lamp 7 of FIG. 1 in addition to slight changes in the energizing circuit of FIG. 2. The two filament prismatic lens lamp 17 of this embodiment includes an off-focus filament of approximately 37.5 watts which is used as an adjunct to low beam illumination and a 60 watt on-focus filament which when energized provides high beam illumination in the same manner as the lamp 7 of the FIG. 1 embodiment.

In this modification the 50 watt on-focus outboard lamps 15 as well as the 37.5 watt off-focus filament within the inboard prismatic lens lamp 17 are energized by operation of instrument panel switch 18 to its first outward, a, position thus providing low beam illumination when dimmer switch 19 is in its first, a, position. Switching dimmer switch 19 to its b position with instrument panel switch 18 in its a position causes the 37.5 watt on-focus filament of turnpike spot lens lamp 16 to be energized and added to the low beam illumination thus providing increased lighting of the left edge of the traffic lane.

When instrument panel switch 18 is pulled out to its second, b, position low beam illumination is again provided by the two 50 watt on-focus outboard lamps 15 and the off-focus 37.5 watt filament of inboard lamp 17 while foot dimmer switch 19 is in its a position. Upon switching of dimmer switch 19 to its b position with panel switch 18 remaining in its second, b, position the on-focus filament of turnpike spot lens lamps 16 will be energized along with the on-focus 60 watt filament of the dual filament lamp 17, while the off-focus 37.5 watt filament of lamp 17 is extinguished thus providing high beam illumination.

In operation, it will be seen then that with instrument panel switch 18 in its first outward a position the dimmer switch 19 operates to switch the headlamp system from low beam illumination including the two lamps 15 and the off-focus 37.5 watt filament of lamp 17 to turnpike beam illumination by adding turnpike spot lens lamp 16, and back again to low beam illumination by extinguishing lamp 16. With instrument panel switch 18 in its second outward b position, dimmer switch 19 operates to switch the headlamp system from the above described low-beam illumination to high beam illumination which includes the lamps 15, lamp 16 and the on-focus 60 watt filament of lamp 17 and back again to low beam illumination.

The following table illustrates the various combinations of illumination available through this embodiment of the invention.

|  | Lamp | | | | |
| --- | --- | --- | --- | --- | --- |
|  | 15 | 16 | 17 | 15 | Total |
| Low Beam, W | 50 | X | 37.5 | 50 | 137.5 |
| Turnpike Beam, W | 50 | 37.5 | 37.5 | 50 | 175 |
| High Beam, W | 50 | 37.5 | 60 | 50 | 197.5 |

It should be understood that the foregoing examples are merely illustrative and that the positions of the units as well as the wattage of all filaments could be changed without departing from the scope of the present invention.

It should thus be apparent from the foregoing that in accordance with the present invention the utilization of a tri-beam headlamp system for vehicles increases the safety factor for highway driving by enabling the total light output to be substantially increased under all conditions while at the same time eliminating objectionable glare to the operator of an approaching vehicle. In addition to increasing the illumination the employment of on-focus filaments provides maximum efficiency for all four lamps and at the same time simplifies the wiring and switching system. Moreover, the illumination of the low-beam lamps under all beam conditions gives a smoother transition between low-beam and either turnpike beam or high-beam because of the adding-on effect, as contrasted with the jumping effect on the operator's vision which is produced by presently existing switching systems. With the low-beam on during high beam operation on hilly country roads the operator does not lose foreground illumination when cresting a hill. The turnpike beam provides the light necessary for high speed turnpike driving by providing adequately illumination of the left edge of the traffic lane with an absence of the glare of present high-beam systems.

Although some embodiments of the present invention have been herein shown and described, it is to be understood that still further modifications thereof may be made without departing from the spirit and scope of this invention.

What is claimed is:
1. In a headlamp system for motor vehicles, the combination of:
   (a) four sealed-beam headlamps each having a relatively high wattage on-focus filament and supported on the front of the motor vehicle with a pair of said headlamps disposed on each side of the center line thereof,
   (b) one lamp of each pair having a prismatic lens and being simultaneously operable when energized to produce low-beam illumination,
   (c) another lamp of either one of said pairs being provided with a spot lens and operable when energized to add its illumination to the two low-beam producing lamps for casting a light beam in the direction of the highway dividing line for turnpike illumination,
   (d) the remaining lamp of said pairs also having a prismatic lens and being operable when energized to add its illumination to the three turnpike illuminating lamps to produce a high-beam illumination for low vehicle density driving, and
   (e) an energizing circuit comprising a two position panel switch operable in one position to cause illumination of the low-beam headlamp of each pair, a dimmer switch operable to add the illumination of the turnpike headlamp without affecting the low-beam illumination, said panel switch in its other position being operable to add the illumination of said remaining headlamp for high-beam country driving, and said dimmer switch being operable to return said system to low-beam illumination from both turnpike and high-beam illumination without any jumping effect.

2. In a headlamp system for motor vehicles, the combination of:
   (a) four sealed-beam headlamps each having a relatively high wattage on focus filament and supported on the front of the motor vehicle with a pair of said headlamps disposed each side of the center line thereof,
   (b) one lamp of each pair having a prismatic lens and being simultaneously operable when energized to produce low-beam illumination,
   (c) a lamp of either one of said pairs being provided with a spot lens and operable when energized to add its illumination to the two low-beam producing lamps for casting a light beam to increase the illumination of the left edge of the traffic lane for turnpike illumination,
   (d) the remaining lamp of said pair also having a prismatic lens and provided with a quartz iodine light source of higher wattage than any of the other of said lamps and being operable when energized to add its illumination to the three turnpike illuminating lamps to produce a high-beam illumination for country driving, and
   (e) an energizing circuit comprising a two-position panel switch operable in one position to cause illumination of the low-beam headlamp of each pair, a dimmer switch operable to add the illumination of the turnpike headlamp without affecting the low-beam illumination, said panel switch in its other position being operable to add the illumination of said remaining headlamp for high-beam low vehicle density driving, and said dimmer switch being operable to return said system to low-beam illumination from both turnpike and high-beam illumination and back again without any jumping effect in transition from one beam to another.

3. In a headlamp system for motor vehicles, the combination of:
   (a) four sealed beam headlamps each having a relatively high wattage on-focus filament with one of such lamps also having an additional off-focus high wattage filament and said lamps being supported on the front of the motor vehicle with a pair of said headlamps disposed on each side of the center line thereof,
   (b) three of said lamps being simultaneously operable when energized to produce low-beam illumination,
   (c) the remaining lamp being operable when energized to add its illumination to the three low-beam producing lamps for casting a light beam downwardly and to the left of said vehicle for turnpike illumination,
   (d) the on-focus filament of said one lamp being operable when energized in lieu of its off-focus filament to add its illumination to the other three on-focus filament lamps to produce a high-beam illumination for low vehicle density driving, and
   (e) an energizing circuit for selectively operating said four sealed beam headlamps.

4. In a headlamp system for motor vehicles, the combination of:
   (a) four sealed-beam headlamps each having a relatively high wattage on-focus filament with one of such lamps also having an additional off-focus high wattage filament and said lamps being supported on the front of the motor vehicle with a pair of said headlamps disposed on each side of the center line thereof,
   (b) three of said lamps being simultaneously operable when energized to produce low beam illumination,
   (c) the remaining lamp being operable when energized to add its illumination to the three low-beam producing lamps for casting a light beam in the direction of the highway dividing stripe for turnpike illumination,
   (d) the on-focus filament of said one lamp being operable when energized in lieu of its off-focus filament to add its illumination to the other three on-focus filament lamps to produce a high-beam illumination for low vehicle density driving, and
   (e) an energizing circuit including a two position dimmer switch and a two position panel switch, said panel switch operable in one position to energize said three low-beam headlamps when said dimmer switch is in a first position, said dimmer switch operable when in its other position to energize said remaining lamp in combination with said low-beam lamps, and said panel switch operable in a second position to energize the on-focus filament of said one lamp in lieu of its off-focus filament.

References Cited
UNITED STATES PATENTS 2,033,381  3/1936  Koubek et al. _____ 240—7.1
2,170,682  8/1939  Frech et al. _____ 315—83 X J. W. LAWRENCE, *Primary Examiner.*

P. DEMEO, *Assistant Examiner.*